Jan. 29, 1924.

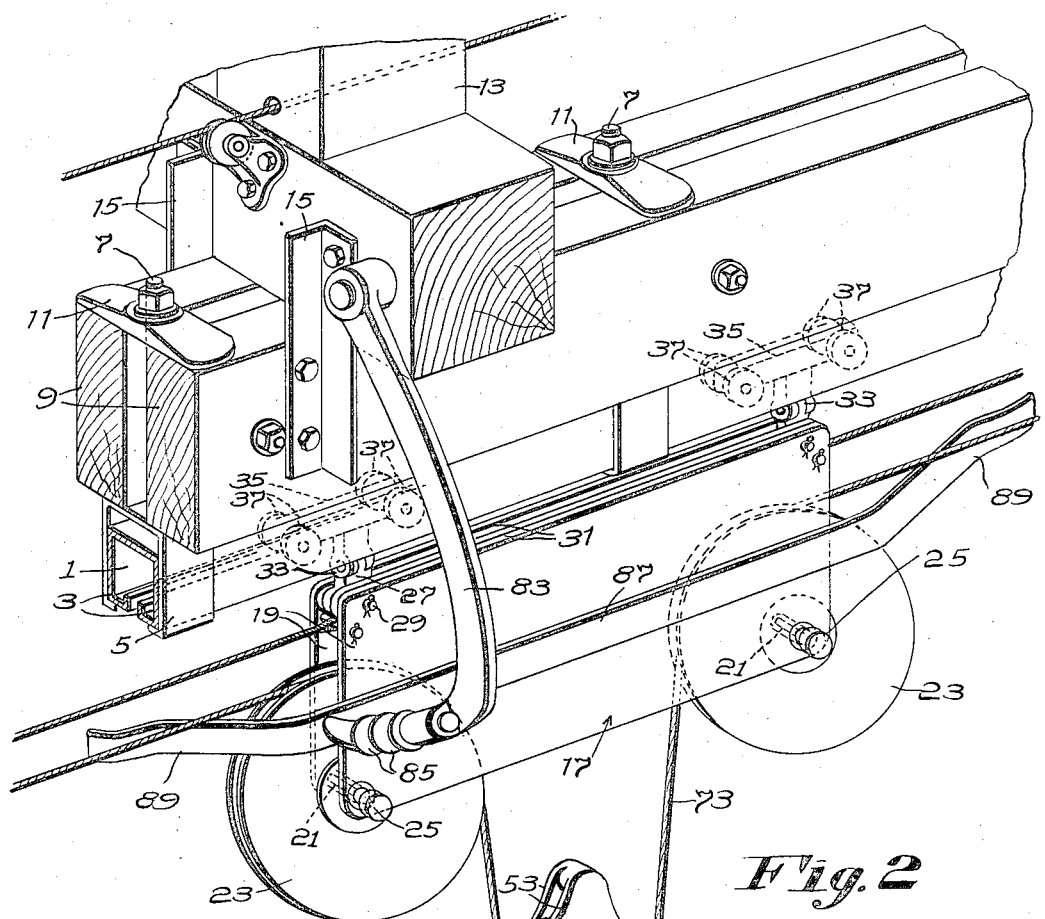
Fig. 2
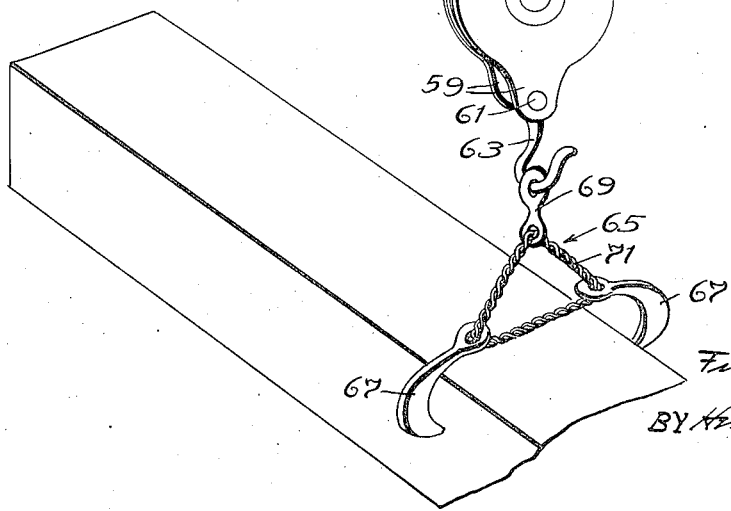

F. P. HUCKINS 1,481,868

CONVEYER APPARATUS

Filed April 30, 1923     7 Sheets-Sheet 3

INVENTOR:
Frank P. Huckins
BY Henry T. Williams,
ATTORNEY.

Jan. 29, 1924. 1,481,868
F. P. HUCKINS
CONVEYER APPARATUS
Filed April 30, 1923  7 Sheets-Sheet 4
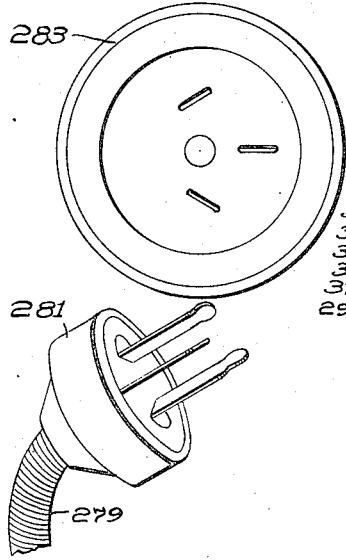
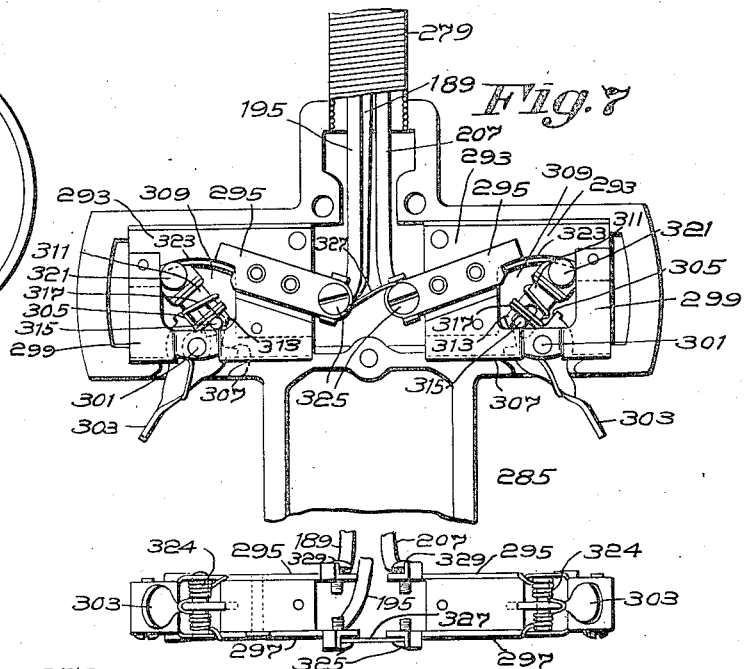
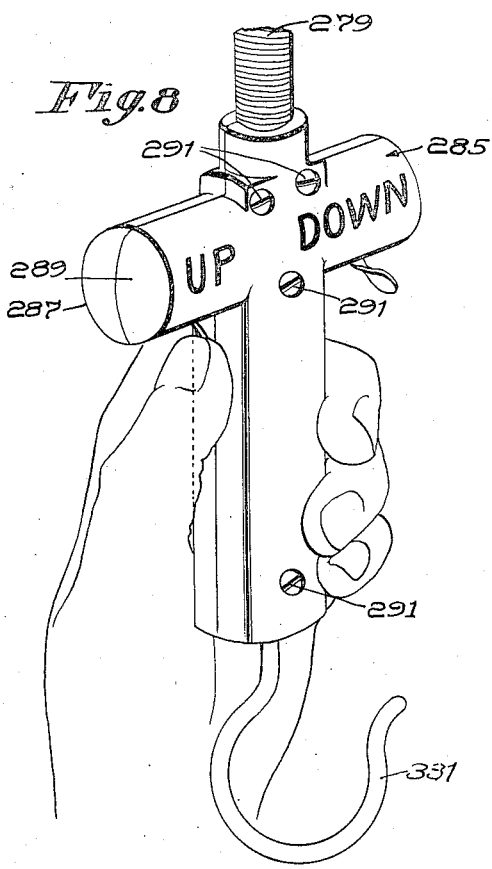
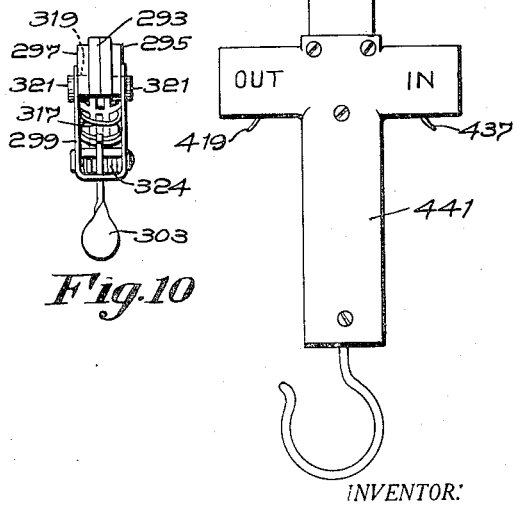
INVENTOR:
Frank P. Huckins
BY Henry T. Williams,
ATTORNEY.

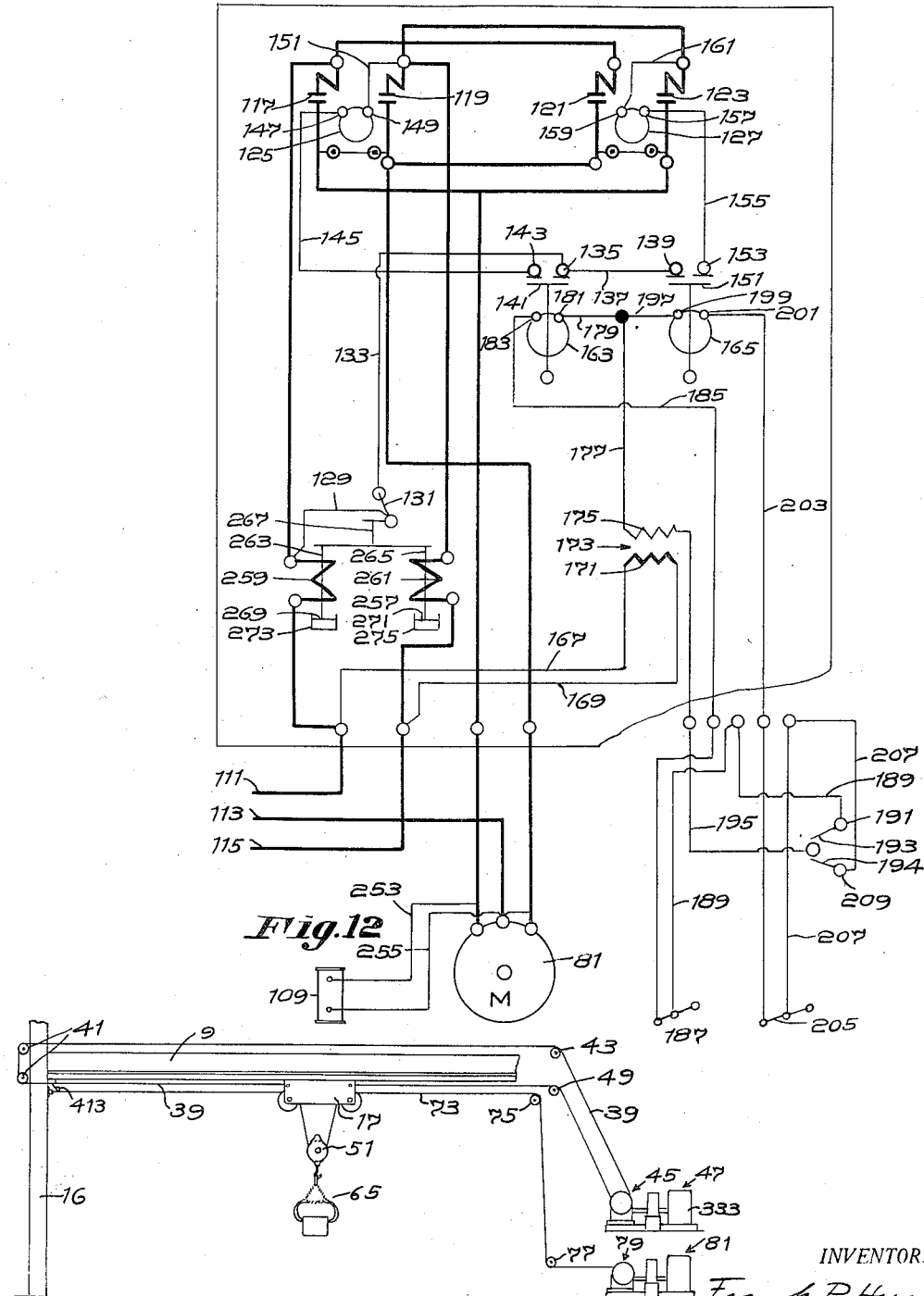

Jan. 29, 1924.　　　　　　　　　　　　　　　　1,481,868
F. P. HUCKINS
CONVEYER APPARATUS
Filed April 30, 1923　　7 Sheets-Sheet 6

INVENTOR:
Frank P. Huckins
BY Henry T. Williams
ATTORNEY.

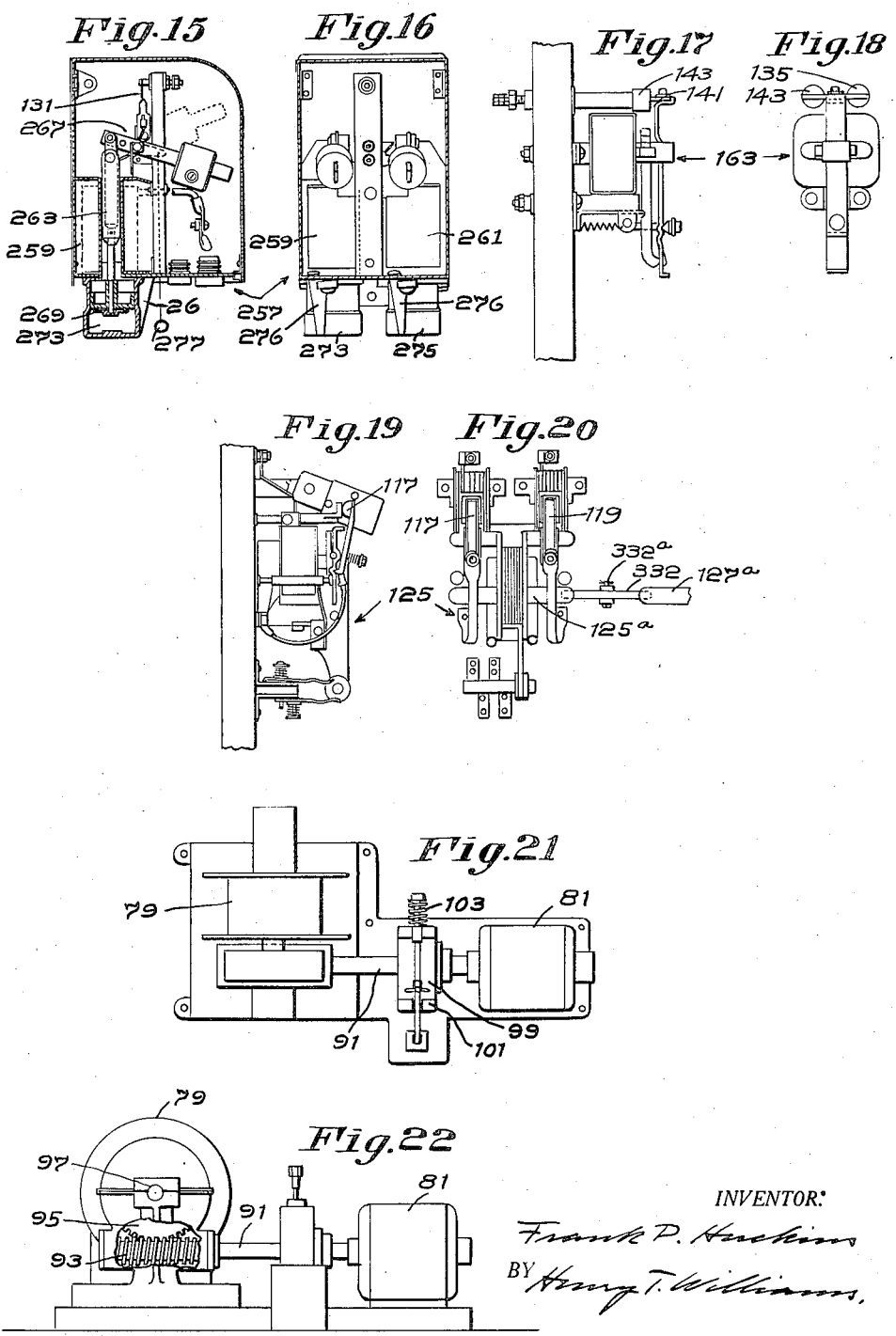

Patented Jan. 29, 1924.

1,481,868

UNITED STATES PATENT OFFICE.

FRANK P. HUCKINS, OF NEWTON, MASSACHUSETTS.

CONVEYER APPARATUS.

Application filed April 30, 1923. Serial No. 635,569.

*To all whom it may concern:*

Be it known that I, FRANK P. HUCKINS, a citizen of the United States, residing at Newton, in the county of Middlesex and State of Massachusetts, have invented certain new and useful Improvements in Conveyer Apparatus, of which the following is a specification.

The invention to be hereinafter described relates to conveying apparatus, and more particularly to apparatus for hoisting and conveying lumber in a yard from one point to another.

One of the purposes of the invention is to provide efficient apparatus whereby the lumber may be quickly hoisted and conveyed. To accomplish this, in the present instance of the invention, there is provided a support which may desirably be in the form of an elevated track, and a light carrier is adapted to travel along this track. The carrier sustains a hoisting device which may desirably be in the form of a hoisting block adapted to be raised or lowered. To advance the carrier along the track, in the present instance of the invention, a stationary electric motor is provided which drives a drum, which in turn operates a cable connected to the carrier and suitably guided.

To raise and lower the hoisting device or block, a stationary motor is provided which drives a drum, which in turn operates a cable having one end anchored adjacent the end of the elevated track, and its opposite end connected to the drum. This cable is suitably guided, and passes over a pair of pulleys on the carrier, and has a loop depending therefrom which passes around the hoisting block.

Since both of these electric motors and their drums are stationary, and not supported by the elevated track or the carrier, the moving mechanism supported by the track may be of light weight, thereby enabling the carrier to be rapidly traversed along the track and enabling the hoisting device to be rapidly raised and lowered.

Another purpose of the invention is to provide remote control for the motors. In carrying this feature into practical effect, in the present instance of the invention, the electric circuits for the motors include switches which are mounted in portable handle means which may be carried from place to place by the operator. This handle means may be at one end of a flexible cord, the opposite end of which may be provided with a plug adapted for insertion in sockets located at convenient points and electrically connected in the motor circuits. The construction is such that the operator may stand at points remote from the stationary motors and drums or near the hoisting device, where he will be in advantageous position for controlling the travel of the carrier along the elevated track, and for controlling the raising and lowering movements of the hoisting block. Also, the construction may be such that if the operator releases or drops the portable switch means, or if a wire breaks, the movements of the hoisting device and the carrier will be automatically arrested.

Other purposes of the invention are to provide means for automatically limiting the travel of the carrier in opposite directions along the track, and to provide means for automatically limiting the raising and lowering movements of the hoisting device, so that the movements thereof will be confined within safe limits.

Still other purposes of the invention are to provide means for automatically arresting the hoisting device in case of overload on its motor, and means for automatically arresting the carrier in case of overload on its motor.

With the aforesaid and other purposes in view, the character of the invention may be best understood by reference to the following description of one good form of the invention, shown in the accompanying drawings, wherein:

Fig. 1 is a perspective view of apparatus embodying the invention;

Fig. 2 on an enlarged scale is a perspective view of a portion of the track, the carrier, and the hoisting block sustained by the carrier;

Fig. 6 is a view of the plug and socket device for the portable cord provided with the handle means carrying the switches for controlling the starting and stopping and direction of rotation of the motors;

Figures 13, 23:
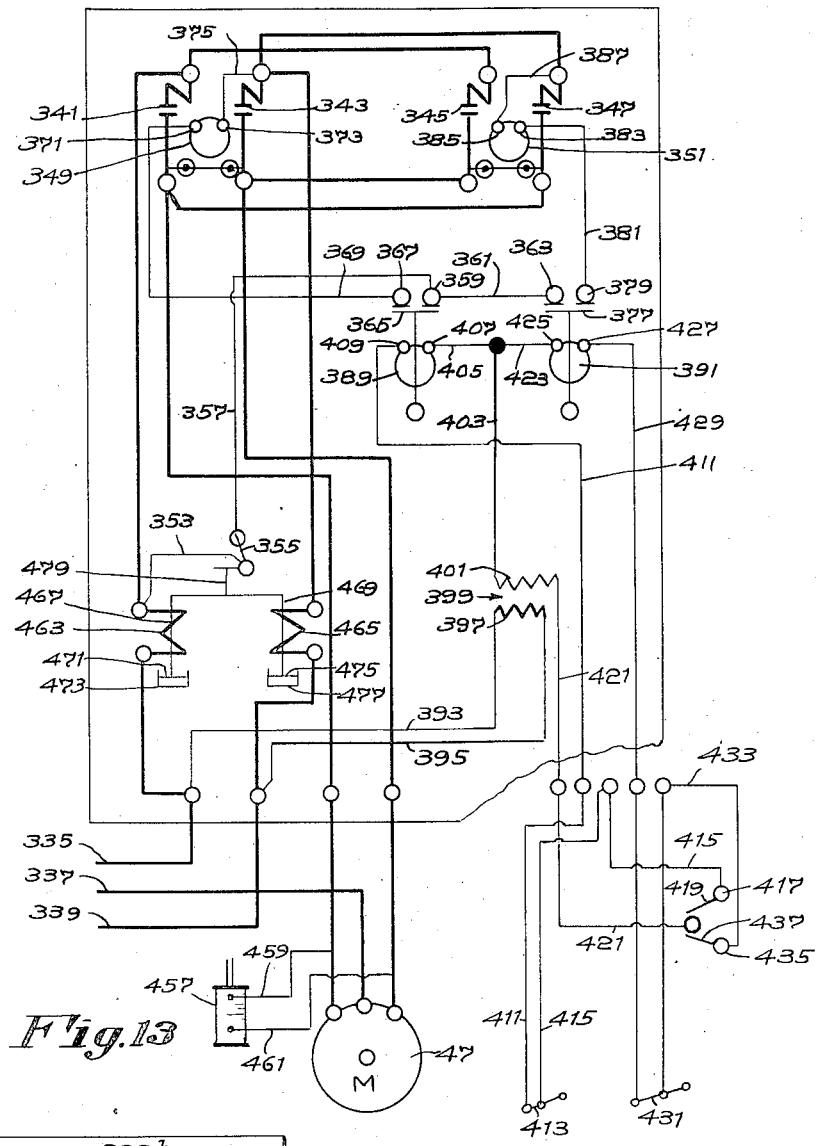

Fig. 7 on an enlarged scale is a view of a portion of the handle having a part thereof removed to disclose the switch mechanism mounted in the handle;

Fig. 8 is a perspective view of the handle illustrating the manner in which it may be grasped by the operator;

Fig. 9 is a detail of the switch devices carried by the handle;

Fig. 10 is a view of one of the switch devices removed from the handle;

Fig. 11 is a side view of the handle for controlling the motor for traversing the carrier;

Fig. 12 is a diagrammatic view showing the electrical circuits for the hoisting motor and devices associated with said circuits;

Fig. 13 is a diagrammatic view showing the circuits for the traversing motor and devices associated with said circuits;

Fig. 14 on a reduced scale is a diagrammatic view showing the motors and the arrangement of the cables for traversing the carrier and raising and lowering the hoisting device;

Figs. 15 and 16 are views of a time limit overload relay device employed in the circuits for the motors;

Figs. 17 and 18 are views of a pilot contactor employed in the pilot control circuits for the motors;

Figs. 19 and 20 are views of a magnetic contactor employed in the main circuits for the motors;

Fig. 21 is a plan of one of the motors, the drum and the electro-magnetic brake for the motor;

Fig. 22 is a side elevation of the construction shown in Fig. 21; and

Fig. 23 is a detail of the mechanical interlock device for the magnetic contactors.

Referring to the drawings, the apparatus shown therein as one good form of the invention comprises a track 1 (Figs. 1 and 2) of general U-shaped section having inturned flanges 3 along which run the wheels of the carrier to be described. This track is supported at intervals by brackets 5 having hanger bolts 7 projecting upward between a pair of beams 9, said hanger bolts being provided with yoke washers 11 resting on the upper edges of said beams. The beams 9 are suspended from trusses 13, and are secured thereto by angle plates 15 bolted to said beams and trusses. The latter may rest on the tops of upright posts 16 which may be braced in any suitable manner.

The carrier 17 (Fig. 2), in the present instance of the invention, comprises a pair of plates 19 carrying bushed spindles 21 on which are journalled sheaves 23 mounted between the plates, said spindles being provided with suitable grease cups 25.

Pendants 27 are secured by pins 29 between the plates 19, and spacing strips 31 are interposed between said pendants and said plates. The pendants are connected by hinges 33 with trolleys 35 having wheels 37 adapted to travel along the flanges 3 of the track 1.

To advance the carrier along the track, there is provided a cable 39 (Figs. 1, 2 and 14) having one end anchored to one end of the carrier. This cable is guided about a pair of pulleys 41 adjacent one end of the track, and said cable extends thence through struts of the trusses 13 toward the opposite end of the track, where it is guided over a pulley 43. The cable extends thence downward toward the ground, and is guided about a pulley 44 (Fig. 1), and is wrapped a few turns about the drum 46 driven by the traversing motor 47. The cable 39 extends from the drum outward over a pulley 48 and upward over a pulley 49, and is connected to an end of the carrier. The construction is such that when the drum is driven, it will operate the cable 39 to move the carrier along the track in a direction depending upon the direction of rotation of the drum.

The hoisting device, in the present instance of the invention, comprises a block 51 (Figs. 1 and 2) comprising a pair of spaced plates 53 carrying a bushed pin 55 on which is journalled a sheave 57. Said plates are formed to present ears 59 carrying a pin 61 from which depends a hook 63 carrying a grab 65 comprising a pair of hooks 67 and a link 69, said hooks and link being provided with eyes through which extends an endless chain 71. The construction is such that these hooks may be relatively adjusted to grasp timbers of different sizes, and when the block is drawn upward, the endless chain 71 will pull the hooks toward opposite sides of the timber and into secure gripping engagement therewith.

Figure 1:
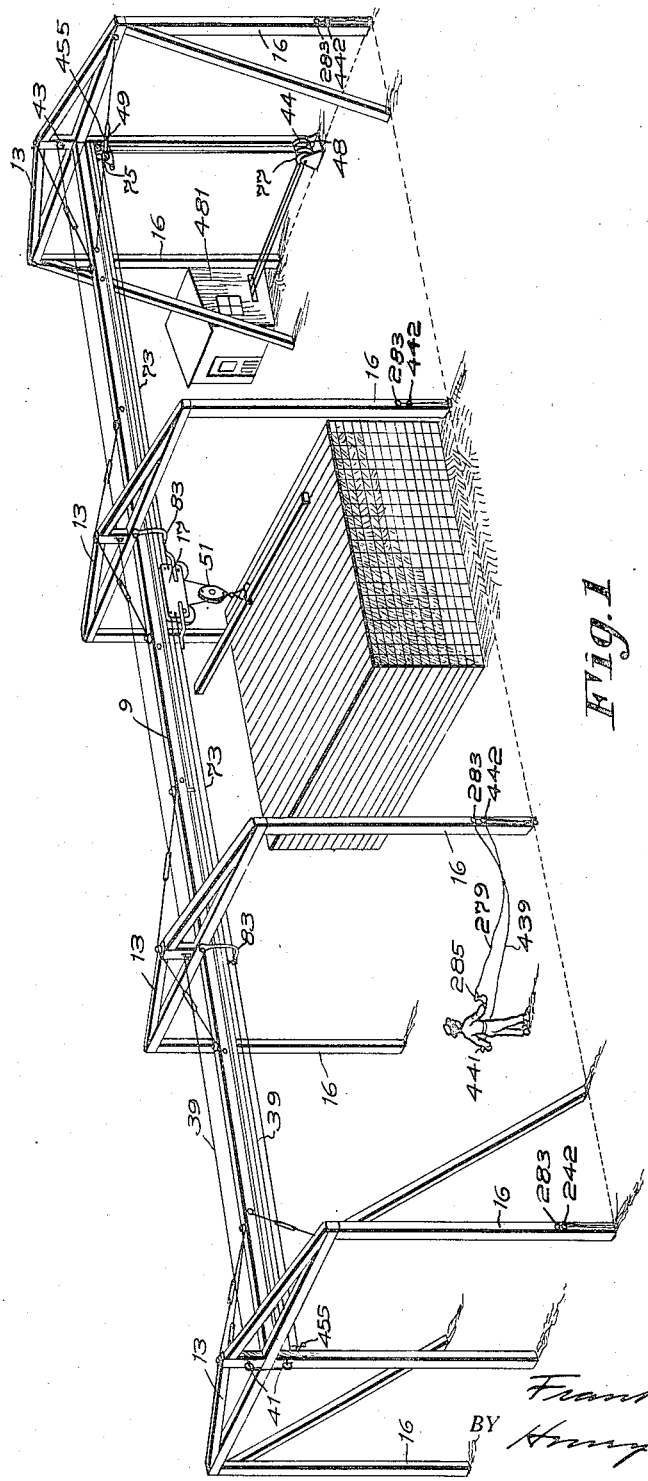

To raise and lower the hoisting block 51, a cable 73 may be provided having one end anchored adjacent the left end of the track (Fig. 1). This cable extends over the carrier sheaves 23 referred to, and presents a loop which is passed about the block sheave 57. The cable extends from the carrier toward the right end of the track, where it passes over a pulley 75, and thence downward around a pulley 77, and thence to the drum 79 which is driven by the motor 81. The construction is such that the motor may operate through the cable 73 to raise or lower the hoisting block and the timber connected thereto. The block will be raised or lowered, depending upon the direction of rotation of the drum, and the block will be moved at one-half the speed of the linear travel of the cable 73.

Suitable means may be provided to prevent the cable 39 and the hoisting cable 73 from sagging the track. This means, in the present instance of the invention, comprises hook-shaped arms 83 (Figs. 1 and 2) having their upper ends pivotally connected to the cross trusses 13, said arms being provided with a pair of rollers 85 on which the cables may rest. The carrier may have a ribbon 87 secured to one of the plates thereof, and terminating in cam fingers 89 which project outward beyond the ends of the carrier.

The arms 83 will rock downward by gravity and normally be in positions such that the rollers 85 thereof will support the portions of the cables which sag downward somewhat beneath their points of entrance into the carrier. However, when the carrier approaches one of the hook arms 83, the cables will be raised upward out of engagement with the rollers 85, and one of the cam fingers 89 will engage the tip of the hook lever 83 and rock the latter laterally out of the path of travel of the carrier, and to the position shown in Fig. 2. As the carrier continues to travel, the tip of the hook lever will wipe along the ribbon 87 and escape from the cam finger 89 at the opposite end of the carrier. Thereupon, the hook lever will be rocked by gravity downward back to its normal position, where it is in readiness to have the cables rest upon the rollers 85 when the cables have sagged sufficiently to reach said rollers.

Figure 3:
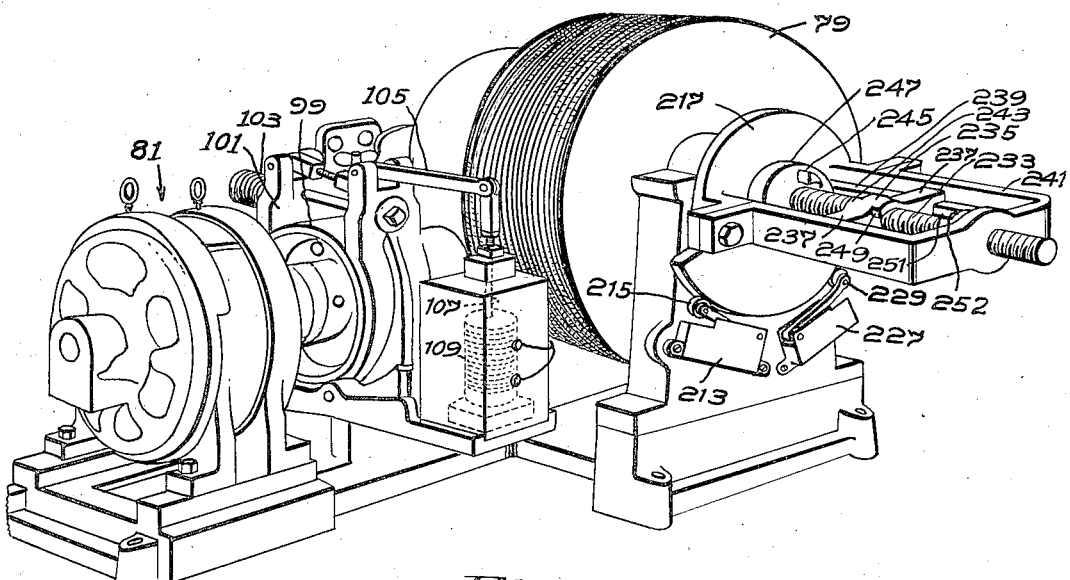
Fig. 3 is a perspective view of the electric motor, the drum driven thereby, an electro-magnetic brake, and limiting switches for controlling the cable for raising and lowering the hoisting device.

The electric motor 81 (Figs. 3, 21 and 22) for operating the hoisting cable may be connected by a coupling shaft 91 (Figs. 21 and 22) with a worm 93 meshing with a worm wheel 95 on the shaft 97 for the drum 79. The shaft 91 may be provided with a suitable brake comprising a drum 99 and a strap 101 urged by a coil spring 103 into embracing engagement with the drum. The strap may be released from the drum by means including a lever 105 connected to the core 107 of a solenoid 109. When the solenoid is energized, it will actuate the core 107 and lever 105 to release the brake.

Since the motor and electro-magnetic brake are of usual well known construction, it is unnecessary to show and describe the same in detail herein.

The hoisting motor 81 may be a three phase alternating current motor having a main circuit comprising the main conductors 111, 113 and 115 (Fig. 12). Main switches 117 and 119 may be introduced into the main conductor lines 111 and 115, and when these switches are closed, the circuit will be completed for causing the motor to rotate in a direction to raise the hoisting device. Main switches 121 and 123 may be interposed in the main conducting lines 111 and 115, and when closed will complete the circuit for causing the motor to rotate in a direction to lower the hoisting device. The switches 117 and 119 may be controlled by a magnetic contactor 125 (Figs. 13, 19 and 20), which may be of standard well known construction, and therefore, it is unnecessary to show and describe the same in detail herein. The switches 121 and 123 may be controlled by a magnetic contactor 127 similar to the magnetic contactor 125.

The magnet coil of the contactor 125 may be energized by a circuit comprising a conductor 129 electrically connected with the main conductor 111, and adapted to be connected by a switch 131 to be described, with a conductor 133 leading to a fixed contact 135 connected in turn by a conductor 137 with a fixed contact 139. The fixed contact 135 is adapted to be connected by a pilot switch 141 with a fixed contact 143 connected in turn by a conductor 145 with one of the terminals 147 of the magnet coil of the contactor 125. The other terminal 149 of said coil is connected by a conductor 151 with the main conductor 115. The construction is such that when the pilot switch 141 connects the contacts 135 and 143, the coil of the magnetic contactor 125 will be energized, and the switches 117 and 119 will be closed to complete the circuit for causing the motor to rotate in a direction to raise the hoisting device.

The contact 139 referred to, may be connected by a pilot switch 151 with a contact 153 connected in turn by a conductor 155 with one of the terminals 157 of the magnet coil for the contactor 127. The other terminal 159 of said coil may be connected by a conductor 161 with the main conductor 115. The construction is such that when the switch 151 connects the contacts 139 and 153, the circuit will be completed for the coil of the contactor 127, and the latter will operate to close the switches 121 and 123 referred to, to complete the circuit for rotating the motor in a direction to lower the hoisting device.

The pilot switch 141 may be controlled by a pilot contactor 163 (Figs. 12, 17 and 18) which may be of standard well known construction, and therefore, it is unnecessary to show and describe the same in detail herein. The pilot switch 151 may be controlled by a pilot contactor 165 which may be similar to the pilot contactor 163.

The circuit for the pilot contactor 163 comprises conductors 167 and 169 tapped from the main conductors 111 and 115 respectively, and connected to one of the coils 171 of a transformer 173. The other coil 175 has one end connected by a conductor 177 with a branch conductor 179 connected in turn to one of the terminals 181 of the pilot contactor coil 163. The other terminal 183 of said coil is connected to a conductor 185 which is adapted to be connected by a limit switch 187 to be described, with a conductor 189 leading to a contact 191. This contact is adapted to be connected by a hand operated switch 193 to be described, with a conductor 195 leading to the other end of the transformer coil 175.

Leading from the conductor 177 referred to, is a branch conductor 197 connected to one of the terminals 199 of the magnet of the pilot contactor 165. The other terminal 201 of said magnet is connected to a conductor 203 adapted to be connected by a limit switch 205 to be described, with a conductor 207 connected to a contact 209. This contact is adapted to be connected by the hand operated switch 194 with the conductor 195 leading to the transformer.

The construction is such that when the hand operated switch 193 is shifted to connect the conductors 195 and 189, the circuit is completed to the magnet of the pilot contactor 163, and the energization of this magnet causes the switch 141 to complete the circuit for closing the switches 117 and 119 to rotate the motor in a direction to cause the hoisting device to rise.

When the hand operated switch 194 is shifted to connect the conductors 195 and 207, the circuit is completed to the magnet of the pilot contactor 165. Energization of this magnet causes the switch 151 to connect the contacts 139 and 153, thereby completing the circuit for closing the switches 121 and 123. This will complete the circuit for the motor to cause the same to rotate in a direction for lowering the hoisting device.

It will be understood that the circuit for the pilot contactor magnet 163 will not be completed unless the limit switch 187 is closed, and that the circuit for the pilot contactor magnet 165 will not be completed unless the limit switch 205 is closed.

The limit switches 187 and 205 are controlled by a device actuated by rotation of the shaft 97 for the hoisting drum 79.

Figure 4:
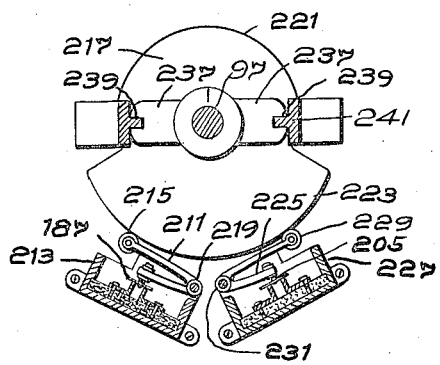
Fig. 4 is a sectional detail of the limiting switch mechanism for interrupting the circuit for the motor when the hoisting device has been raised or lowered to predetermined limits.

The limit switch 187 (Fig. 4) is carried by a bell-crank 211 pivotally mounted on a box 213 which may be mounted adjacent the hoisting drum 79. On the end of one of the arms of the bell-crank is a roller 215 adapted to engage the periphery of a cam 217 loose on the drum shaft 97. The roller is urged into engagement with the periphery of the cam by a coil spring 219. The cam has a peripheral portion 221 of shorter radius than its portion 223.

The limit switch 205 is carried by a bell-crank 225 pivotally mounted on a box 227 which also may be mounted adjacent to the hoisting drum 79. At the end of one of the arms of the bell-crank 225 is a roller 229 adapted to engage the periphery of the cam. This roller is pressed against the cam by a coil spring 231 acting on the bell-crank.

The hoisting drum shaft has a threaded portion 233 projecting outward beyond the cam 217, and a nut 235 threaded on said shaft has diametrically opposed wings 237 provided with notches adapted to slide along ribs 239 projecting inward from a yoke 241 secured to the cam 217. The nut has a notch 243 adapted to engage a lug 245 on a boss 247 on the cam 217, and said nut has a notch 249 adapted to engage a lug 251 on a boss 252 projecting inward from the outer end of the yoke 241. The cam is prevented from rotating when the nut 235 is not in engagement with either of the lugs 245 and 251 by the frictional engagement of the spring-pressed rollers 215 and 229 with the periphery of the cam.

The construction is such that when the hoisting drum is rotated in one direction, it will cause the nut 235 to move along the yoke until the notch 243 thereof engages the lug 245. Thereupon, the cam will be rotated and cause the longer radius portion 223 thereof to move past the bell-crank roller 229, and allow the same to be rocked by the coil spring 231 into engagement with the shorter radius portion of the cam. This will open the switch 205, and break the pilot circuit, which will de-energize the magnet of one of the pilot contactors, and thereby interrupt the main motor circuit and arrest the motor.

When the hoisting drum is rotated in the opposite direction, the nut 235 will travel outward along the yoke until the notch 249 of the nut engages the lug 251. Thereupon, the yoke and the cam 217 will be rotated in an opposite direction, and open the limit switch 187, thereby interrupting the circuit for the motor.

Thus, the construction is such that the circuit for the motor will be automatically interrupted after the hoisting drum has been rotated a predetermined number of turns in either direction, and the raising and lowering movements of the hoisting device will be automatically confined within safe limits.

It is desirable that the electro-magnetic brake shall be applied to absorb the momentum of the moving parts of the hoisting mechanism when the circuit for the motor is interrupted. To accomplish this, the magnet coil 109 referred to, may be connected by conductors 253 and 255 with the main conductors 111 and 115 respectively, of the hoisting motor circuit. The consequence is that when this circuit is interrupted, the coil 109 will be de-energized automatically, and the coil spring 103 will become effective to apply the brake and overcome the momentum of the moving parts.

To automatically arrest the hoisting device motor in case of overload thereon, the switch 131 referred to, in the pilot control circuit for the main conductor switches may be under control of the time limit circuit breaker 257 (Figs. 12, 15 and 16) which includes a magnet coil 259 interposed in the main conductor 111, and a magnet coil 261 interposed in the main conductor 115. Co-operating with these coils are cores 263 and 265 connected to an actuator 267. The lower ends of the cores 263 and 265 are connected to plungers 269 and 271 in oil dash pots 273 and 275 having by-passes 276.

The construction is such that in case of overload on the main motor circuit continued for a predetermined length of time, the magnet coils 259 and 261 will draw the cores downward as checked by the plungers in the dash pots, and the actuator 267 will move the switch 131 to open the pilot circuit for the main switches, thereby breaking the main circuit for the hoisting motor, and arresting the hoisting device. The switch 131 may be manually closed by means of a pull cord 277.

Since the time limit overload device is of usual well known construction, it is unnecessary to show and describe the same in detail herein.

An important feature of the invention is the remote control of the hoisting motor. In carrying this feature into practical effect, portions of the pilot circuit conductors 195, 189 and 207 referred to, may be enclosed in an insulating cord or cable 279 (Figs. 6, 7 and 8) having at one end thereof a plug 281 adapted to be inserted in any one of a number of sockets such as the sockets 283, these sockets being placed at convenient locations in the lumber yard or other field of operations (Fig. 1).

At the opposite end of the cord 279 is a T-shaped handle 285 which may be formed of two parts 287 and 289 secured together by screws 291.

Mounted in this handle are a pair of switch devices, each comprising a block 293 (Figs. 7 and 9) of leather or other suitable insulation material, having secured at opposite faces thereof a pair of contacts 295 and 297. Embracing the block is a U-shaped plate 299 carrying a pivot pin 301 on which is mounted a lever 303 which projects outward from the handle 285. The inner end of the lever 303 is formed to present a pair of shoulders 305 and 307 angularly disposed with respect to each other. Mounted in a recess 309 in the block 293 is a slug 311 of fiber or other suitable insulation material having at one end thereof a fork 313 receiving a pin 315 urged toward the outer end of the fork by a coil spring 317 encircling the slug and confined between the pin 315 and a circumferential shoulder of the slug. The opposite end of the slug has a metal stud 319 mounted therein provided with heads 321 adapted to slide along guides 323 formed on the block 293.

The construction is such that when the operator holds the handle 285, he may press the lever 303 (Fig. 8), thereby causing the lever shoulder 307 to push the pin 315 inward in the fork 313 against the opposition of the spring 317. As the lever 303 is rocked, it will also rock the slug about the stud 319 as a fulcrum until the pin 315 has been shifted outward somewhat beyond said stud. Thereupon, the energized spring 317 will become effective to snap the stud from its open position shown in Fig. 7 to its closed position, thereby bringing the heads 321 into engagement with the contacts 295 and 297. The spring will firmly press said heads against the contacts.

The lever 303 is urged to its open position shown in Fig. 7 by a coil spring 324 encircling the pin 301 and having a bend engaging a shoulder on the lever, and ends suitably anchored to the U-shaped plate 299.

The construction is such that whenever the operator releases the lever 303, the coil spring 324 will become effective to rock said lever to its position shown in Fig. 7. In the course of this movement the lever shoulder 305 will press against the slug and rock the same about the stud 319 as a fulcrum until the pin 315 has been moved inward somewhat beyond the stud, the coil spring 317 being energized by this rocking movement of the stud. After the slug has been rocked as described, the spring will become effective to shift and snap the slug back to its position shown in Fig. 7, thereby moving the heads 321 away from the contacts 295 and 297.

The switches 193 and 194 in the diagram shown in Fig. 12, are in the form of the stud 319, and the contacts 191 and 209 shown in said diagram, have the form of the contacts 295 and 297 respectively. The two contacts 297 may be provided with binding screws 325, bridged by a wire 327, and one of said binding screws may be connected to the pilot circuit conductor 195 referred to. The contacts 295 opposed to the contacts 297 may be provided with binding screws 329, one of which is connected to the conductor 189, and the other of which is connected to the conductor 207.

Therefore, when the operator grasps the handle 285, he may readily press one or the other of the levers 303, thereby to complete the circuit for actuating one or the other of the pilot contactors 141 and 151, the latter in turn completing the pilot circuit for operating one or the other of the switches of the main circuit for the motor so as to cause the latter to rotate in a direction to raise or lower the hoisting device at will. The handle 285 may be marked with the words "Up" and "Down" (Fig. 8) opposite the switches, thereby to indicate to the operator which of the levers 303 is to be pressed in obtaining the desired control of the motor and the hoist. The handle may be provided with a hook 331 enabling the handle to be suspended on the operator's belt or some part of his clothing, in case he desires to employ his hand for a purpose other than grasping the handle.

The switches 117 and 119 of the magnetic contactor 125 should never close at the same time that the switches 121 and 123 of the magnetic contactor 127 close. To prevent the simultaneous operation of said pairs of switches, a mechanical interlock device may be provided comprising a lever 332 (Figs. 20 and 23) pivotally mounted on a pin 332ª on a post 332ᵇ on the support for the magnetic contactors. This lever has an end engaging the rock carrier 125ª for the switches 117 and 119, and an end engaging the rock carrier 127ª for the switches 121 and 123.

The consequence is that when the switches 117 and 119 are closed, the lever 332 will be rocked to hold the switches 121 and 123 open. On the other hand when the switches 121 and 123 are closed, the lever 332 will be rocked to hold the switches 117 and 119 open.

The electric motor 47 for operating the cable for traversing the carrier may impart rotation to the drum 45 by means of a shaft, worm and worm gear similar to the transmission between the hoisting motor and the drum driven thereby. The shaft may be provided with a brake 333 (Fig. 14) comprising a drum and a strap urged by a coil spring into embracing engagement with the drum, said strap being released by means including a lever connected to the core of a solenoid, this brake mechanism being the same as that disclosed in Fig. 3 for the hoisting motor shaft.

The traversing motor may be a three-phase alternating current motor having a main circuit comprising the main conductors 335, 337 and 339 (Fig. 13). Main switches 341 and 343 may be introduced into the main conductor lines 335 and 339, and when these switches are closed, the circuit will be completed for causing the motor to rotate in a direction to move the carrier out along its track. Main switches 345 and 347 may be introduced into the main conductor lines 335 and 339, and when these switches are closed, the circuit will be completed for causing the motor to rotate in a direction to cause the carrier to travel in along its track.

The switches 341 and 343 may be controlled by a magnetic contactor 349 such as the magnetic contactor 125 (Figs. 19 and 20), and the switches 345 and 347 may be controlled by a similar magnetic contactor 351.

The magnet coil of the contactor 349 may be energized by a circuit comprising a conductor 353 electrically connected with the main conductor 335 and adapted to be connected by a switch 355 with a conductor 357 leading to a fixed contact 359 connected in turn by a conductor 361 with a fixed contact 363. The fixed contact 359 is adapted to be connected by a pilot switch 365 with a fixed contact 367 connected in turn by a conductor 369 with one of the terminals 371 of the magnet coil of the contactor 349. The other terminal 373 of said coil is connected by a conductor 375 with the main conductor 339. The construction is such that when the pilot switch connects the contacts 359 and 367, the coil of the magnetic contactor 349 will be energized, and the switches 349 and 343 will be closed to complete the circuit for causing the traversing motor to rotate in a direction to move the carrier out along its track.

The contact 363 referred to, may be connected by a pilot switch 377 with a contact 379 connected in turn by a conductor 381 with one of the terminals 383 of the magnet coil for the contactor 351. The other terminal 385 of said coil may be connected by a conductor 387 with the main conductor 339. The construction is such that when the switch 377 connects the contacts 363 and 379, the circuit will be completed for the coil of the magnetic contactor 351, and the latter will operate to close the switches 345 and 347 to complete the circuit for rotating the traversing motor in a direction to move the carrier in along its track.

The pilot switch 365 may be controlled by a pilot contactor 389, such, for example, as the pilot contactor 163 shown in Figs. 17 and 18, and the pilot switch 377 may be controlled by a similar pilot contactor 391.

The circuit for the pilot contactor 389 comprises conductors 393 and 395 tapped from the main conductors 335 and 339 respectively, and connected to one of the coils 397 of a transformer 399. The other coil 401 of the transformer has one end connected by a conductor 403 with a branch conductor 405 connected to one of the terminals 407 of the pilot contactor coil. The other terminal 409 of said coil is connected to a conductor 411 which is adapted to be connected by a limit switch 413 to be described, with a conductor 415 leading to a contact 417. This contact is adapted to be connected by a hand operated switch 419 with a conductor 421 leading to the other end of the transformer coil 401.

Leading from the conductor 403 referred to, is a branch conductor 423 connected to one of the terminals 425 of the coil of the pilot contactor 391. The other terminal 427 of said coil is connected to a conductor 429 adapted to be connected by a limit switch 431 to be described, with a conductor 433 connected to a contact 435. This contact is adapted to be connected by a switch 437 with the conductor 421 leading to the transformer.

Portions of the conductors 415, 421 and 433 may be enclosed in an insulation tube or cable 439 (Fig. 11), and the switches 419 and 437 may be mounted in a handle 441, said switches and handle being similar to those already described for controlling the hoisting motor. The handle may be marked with the words "Out" and "In" to indicate the proper switch to operate to cause the motor to rotate in a direction to advance the carrier out or in on its track. At one end of the cable 439 is a plug which may be inserted in any one of the sockets 442 which may be similar to the sockets 283 referred to.

When the hand operated switch 419 is shifted to connect the conductors 421 and 415, the circuit is completed to the magnet of the pilot contactor 389, and the energization of this magnet causes the switch 365 to complete the circuit for closing the switches 341 and 343 to rotate the traversing motor in a direction to cause the carrier to move out on its track.

When the hand operated switch 437 is shifted to connect the conductors 421 and 433, the circuit is completed to the magnet of the pilot contactor 391, and the energization of this magnet causes the switch 377 to connect the contacts 363 and 379, thereby completing the circuit for closing the switches 345 and 347 to rotate the traversing motor in a direction to cause the carrier to move in on its track.

The switches 341 and 343 of the magnetic contactor 349 should never close at the same time that the switches 345 and 347 of the magnetic contactor 351 close. To prevent the simultaneous operation of said pairs of switches, a mechanical interlock device may be provided for said contactors similar to that already described and shown in Figs. 20 and 23.

Figure 5:
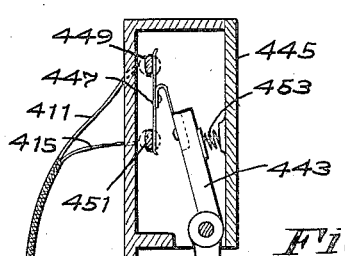
Fig. 5 is a sectional detail of one of the switches for interrupting the circuit for the carrier traversing motor to arrest the carrier automatically after it has travelled along the track a predetermined distance.

It will be understood that the circuit for the pilot contactor magnet 389 will not be completed unless the limit switch 413 is closed, and that the circuit for the pilot contactor magnet 391 will not be completed unless the limit switch 431 is closed. The limit switch 413 is located at one end of the carrier track, and the limit switch 431 is located at the opposite end of said track. Each of these limit switches comprises a lever 443 (Fig. 5) pivotally mounted on a box 445. At one end of said lever is secured a spring bridge contact 447 corresponding to either of the limit switches 413 and 431 referred to, said bridge contact being adapted to engage the contacts 449 and 451 respectively connected to the proper conductor, and said contacts being suitably mounted within the box 445. The lever 443 is urged in a direction to press the switch 413 against the contacts 449 and 451 by a coil spring 453 confined between said lever and a wall of the box. The lever projects outward through the lower end of the box and carries a roller 455.

The construction is such that when the carrier approaches either end of the track, it will engage the roller 455 and rock the lever 443 and move the switch 447 out from engagement with the contacts 449 and 451, thereby interrupting the pilot circuit and causing the switches in the main circuit for the motor to open and thereby arrest the motor.

It is desirable that the electro-magnetic brake 333 referred to, for the traversing motor, shall be applied to absorb the momentum of the moving parts of the carrier traversing mechanism when the circuit for the motor is interrupted. To accomplish this, the magnet coil 457 (Fig. 13) of the brake may be connected by conductors 459 and 461 with the main conductors 335 and 339 respectively, of the traversing motor circuit. The consequence is that when this circuit is interrupted, the coil 457 will be deenergized automatically, and the coil spring of the electro-magnet will become effective to apply the brake and overcome the momentum of the moving parts.

It is desirable that means shall be provided for automatically arresting the carrier in case of overload on its motor. This means, in the present instance of the invention, comprises a time limit circuit breaker which includes a magnetic coil 463 in the main conductor line 335, and a coil 465 in the main conductor line 339. Cooperating with the coil 463 is a core 467, and cooperating with the coil 465 is a core 469. The lower end of the core 467 is connected to a plunger 471 in an oil dash pot 473, and the lower end of the core 469 is connected to a plunger 475 in an oil dash pot 477. The upper ends of the cores are connected to an actuator 479 adapted to open the switch 355 referred to, in the pilot control circuit. This circuit breaking device may be similar to the device 257 (Figs. 15 and 16) above referred to.

The construction is such that if overload is continued on the traversing motor for a predetermined length of time, the actuator 479 will be effective to open the switch 355 to interrupt the pilot control circuit and open the switches of the main circuit for the motor, thereby to arrest the motor. The switch 355 may be manually reset or closed by operation of a pull cord such as the pull cord 277 referred to.

The motors, drums, electro-magnetic brakes, and the control devices of the electrical circuits may all be mounted in a house 481 (Fig. 1) in any convenient location. It is unnecessary for the operator controlling the raising and lowering of the hoisting device and the traversing of the carrier to be within said house, but he may stand at any point most convenient for watching and controlling the hoisting device and the carrier. He may hold the hoist control handle 285 in one of his hands, and the carrier control handle 441 in his other hand, and by operation of the switches in these handles, he may effectively control the action of the hoisting device and the movements of the carrier.

In operation, the plugs at the ends of the flexible cords may be introduced into the sockets at the station which is most convenient for the operator.

By pressing one or the other of the levers of the hoist control handle, he may start the motor rotating to raise or lower the hoisting block and grab to the elevation desired. Then the grab is applied to a piece or pieces of lumber. The operator then presses the handle lever to rotate the motor in a direction to elevate the hoisting device and the lumber. Then the operator presses one or the other of the levers of the traverse control handle, thereby rotating the traverse control motor in a direction to cause the carrier for the hoisting device to travel in or out as desired. Then the operator presses the lever of the hoist control handle to cause the motor to rotate in a direction to lower the hoisting device the distance required for depositing the lumber.

If through inadvertence the operator should fail to release one of the handle levers to cause arrest of the hoisting device before it has moved up or down beyond safe limits, the automatic limiting switches will be opened, and thereby automatically arrest the hoisting device. If through inadvertence the operator fails to release the lever of the traverse handle before the carrier has travelled in or out beyond safe limits, the automatic limiting switches will operate automatically to arrest the carrier.

If too great a load is placed on the hoisting device and its motor, or on the carrier and its motor, and such overload continues for a predetermined length of time, the automatic time limit relay devices will become effective to interrupt the main motor circuits and arrest the motors.

Since the hoisting device drum is driven by its motor through a worm and worm gear transmission, the latter will automatically lock the drum, and through the cable therefor will hold the hoisting device at whatever elevation it may be when the motor is arrested.

Since the traverse drum is driven by its motor through a worm and worm gear transmission, the latter will automatically lock the drum, and through the cable therefor hold the carrier wherever it may be when the motor is arrested.

Since the switch levers of the hoist control handle and the traverse control handle are urged by springs to positions for opening the switches controlled thereby, these switches will remain closed only so long as the operator presses on the levers. If for any reason the operator should relax his pressure on the switch levers, the switches will automatically be opened, and thereby arrest the motors.

Since the control circuits for the main motor circuits are provided with transformers which bring down the potential of the control circuits, the operator will be in no danger of injurious shock, and there will be no fire hazard therefrom.

It will be observed that the hoisting device carrier is of very light construction, and does not sustain a motor or other driving mechanism either for propelling the carrier or for raising and lowering the hoisting device. Also, it does not sustain an operator's cab and an operator. But on the contrary, the traversing and hoisting machinery are mounted on the ground in a house remote from the carrier. The consequence is that the carrier is called upon to support only the live load, and since the total load is so light, the hoisting device may be rapidly raised and lowered, and the carrier may be rapidly traversed along the track.

While the track for the carrier, in the present instance of the invention, is supported by a series of frames located at intervals, it will be understood that the track may be mounted on any suitable support.

While the apparatus has been described more particularly with reference to hoisting and conveying lumber, it will be understood that other articles or materials may be hoisted and conveyed thereby.

It will be understood that the invention is not limited to the specific embodiment shown, and that various deviations may be made therefrom without departing from the spirit and scope of the appended claims.

What is claimed is:

1. Conveying apparatus, comprising, in combination, an overhead support, a carrier movable along the support, a stationary electric motor mounted on the ground, a drum driven by the motor, a cable for transmitting movement from the drum to the carrier, guides for the cable, an electric circuit for said motor, and a flexible cord including a portion of said circuit and having a portable handle provided with switch means adapted to be carried and actuated by the operator on the ground, said switch means having provision for controlling the starting, stopping and direction of rotation of the motor.

2. Conveying apparatus, comprising, in combination, an overhead support having a track thereon, a carrier movable along the track, a stationary electric motor mounted on the ground and transmission means between the motor and the carrier for causing the latter to travel along the track, and an electric circuit for the motor having a portable switch device adapted to be carried and actuated by the operator on the ground to control the motor at different points remotely therefrom.

3. Conveying apparatus, comprising, in combination, an overhead support, a carrier movable along the support, means including a stationary electric motor for moving the carrier along the support, an electric circuit for the motor having switch means, and a control circuit for said switch means having portable switch means adapted to be carried and actuated by the operator at points remote from the stationary motor, said switch means having provision for controlling the starting, stopping and direction of rotation of said motor.

4. Conveying apparatus, comprising, in combination, an overhead support, a carrier movable along the support, means including a stationary electric motor for moving the carrier along the support, an electric circuit for the motor having a socket, a flexible cord containing a portion of said circuit, said cord being provided with a plug at one end thereof for connection with the socket and a portable handle at the opposite end thereof carried by the operator and having switch means with provision for controlling the starting, stopping and direction of rotation of said motor.

5. Conveying apparatus, comprising, in combination, an overhead support, a carrier movable along the support, means including a stationary electric motor for moving the carrier along the support, an electric circuit for the motor having sockets located at intervals, a flexible cord including a part of said circuit, said cord being provided with a plug at one end thereof for connection with any of the sockets and provided with a portable handle at the opposite end thereof adapted to be carried by the operator on the ground and having switch means with provision for starting and stopping the motor and controlling the direction of rotation thereof.

6. Conveying apparatus, comprising, in combination, an overhead support, a carrier movable along the support, means including a stationary motor for advancing the carrier along the support, and means for controlling the starting and stopping and controlling the direction of rotation of the motor including a portable handle adapted to be carried by the operator on the ground and provided with switch means in the electric circuit for the motor.

7. Conveying and hoisting apparatus, comprising, in combination, an overhead support, a carrier movable along the support, a hoisting device mounted on the carrier, means including a stationary electric motor for advancing the carrier along the support, means including a stationary electric motor for raising and lowering the hoisting device, control circuits for said motors, and means including portable manually operable means adapted to be carried and operated by an operator on the ground remotely from the motors for controlling the circuits, the starting and stopping and direction of rotation of said motors.

8. Conveying and hoisting apparatus, comprising, in combination, an overhead support, a carrier movable along the support, a hoisting device sustained by the carrier and adapted to be raised and lowered, a pair of stationary electric motors and drums driven respectively by said motors, a cable adapted to be moved by one of the drums for advancing the carrier along the support; a cable adapted to be moved by the other drum for raising and lowering the hoisting device, and control means for said motors including electrical circuits, switches in said circuits, and portable handle means receiving said switches and adapted to be carried by the operator on the ground for controlling the motors at points remote therefrom.

9. Conveying and hoisting apparatus, comprising, in combination, an overhead support, a carrier movable along the support, a hoisting device sustained by the carrier and adapted to be raised and lowered, a pair of stationary electric motors and drums driven by said motors respectively, a cable operated by one of the drums to advance the carrier along the support, a cable operated by the other drum for raising and lowering the hoisting device, and means including a portable manually operated control means adapted to be carried by the operator on the ground and having provision for starting and stopping the motors and determining the direction of rotation thereof.

10. Apparatus of the character described, comprising, in combination, an overhead support, a carrier movable along the support, a hoisting device on the carrier, a pair of stationary electric motors, drums driven by said motors, a cable operated by one of the drums to advance the carrier on the support, a cable operated by the other drum for raising and lowering the hoisting device, and electrical circuits for said motors including means automatically to limit the travel of the carrier in opposite directions and limit the raising and lowering movements of the hoisting device.

11. Apparatus of the character described, comprising, in combination, an overhead support, a carrier movable along the support, an electric motor, a drum driven by the motor, a cable operated by the drum and connected to the carrier to advance the same along the support, and an electric circuit for the motor including switch devices on the support automatically operated to break the motor circuit and arrest the motor when the carrier has travelled in opposite directions to predetermined limits.

12. Apparatus of the character described, comprising, in combination, an overhead support, a carrier movable along the support, a stationary electric motor, a drum driven by said motor, a cable operated by the drum to advance the carrier along the support, and an electric circuit for the motor, including switches on the support and automatically operated by the carrier to interrupt the circuit when the carrier reaches predetermined limits of travel, and portable switch means in said circuit manually actuated by the operator on the ground for starting and stopping and determining the direction of rotation of the motor.

13. Apparatus of the character described, comprising, in combination, an overhead support, a carrier movable along the support, a hoisting device on the carrier, a stationary electric motor, a drum driven by the motor, a cable operated by the drum for raising and lowering the hoisting device, and an electric circuit for the motor including therein a portable manually operable switch device adapted to be carried by the operator on the ground and having provision for controlling the starting and stopping and direction of rotation of the motor, and means for automatically interrupting the circuit to arrest the motor when the hoisting device has moved up or down to predetermined limits.

14. Apparatus of the character described, comprising, in combination, a support, a hoisting device on the support, and means for raising and lowering the hoisting device including an electric motor, a drum rotated by the motor, a cable between the drum and the hoisting device, a circuit for said motor, a limiting switch in said circuit, and a device operated by the motor for automatically opening the limiting switch after the drum has made a predetermined number of turns.

15. Apparatus of the character described, comprising, in combination, a support, a hoisting device on the support, an electric motor, a drum driven by the motor, a cable extending from the drum to the hoisting device, an electric circuit for the motor, limiting switches in said circuit, and means for automatically opening one or the other of said switches when the hoisting device has been moved a predetermined distance, thereby to interrupt the circuit and arrest the motor.

16. Apparatus of the character described, comprising, in combination, a support, a carrier movable along the support, a hoisting device on the carrier, means including an electric motor for causing the carrier to travel along the support, means including an electric motor for raising and lowering the hoisting device, and electric circuits for said motors, each including an overload switch having provision for interrupting the motor circuit in case the overload continues thereon a predetermined length of time.

17. Apparatus of the character described, comprising, in combination, a support, a carrier movable along the support, a hoisting device on the carrier, means including a stationary electric motor for causing the carrier to travel along the support, means including a stationary electric motor for operating the hoisting device, electric circuits for said motors, switches in said circuits, and means for controlling said switches including control circuits having electro-magnetic means cooperating with the switches of the motor circuits, and manually operable switches in the control circuits for controlling the operation of the switches in the motor circuits.

18. Apparatus of the character described, comprising, in combination, a support, a carrier movable along the support, a hoisting device on the carrier, means including a stationary electric motor for causing the carrier to travel along the support, means including a stationary electric motor for operating the hoisting device, main electrical circuits for said motors, switches in said circuits for controlling the starting and stopping and direction of rotation of said motors, a control circuit including electro-magnetic coils for controlling the switches of the motor circuits, switch means in the control circuits for interrupting the same in case the carrier and the hoisting device move beyond predetermined distances, and manually operable switch devices in the control circuits operable for starting and stopping and determining the direction of rotation of the motors.

19. Apparatus of the character described, comprising, in combination, a support, a carrier movable along the support, means including a stationary electric motor, a drum and a cable for causing the carrier to travel along the support, a brake for the motor and drum, spring means for applying the brake, and means for releasing the brake including a solenoid having a coil connected into the motor circuit, that the solenoid may be energized and release the brake when the circuit is completed for starting the motor.

20. Apparatus of the character described, comprising, in combination, a support, a hoisting device thereon and adapted to be raised and lowered, means for operating the hoisting device including a stationary electric motor, a drum and a cable, an electric circuit for the motor, a brake for the motor and drum, spring means for applying the brake, and a solenoid for releasing the brake and having a coil electrically connected into the motor circuit, that the solenoid may be energized to release the brake when the motor circuit is completed to start the motor and operate the hoisting device.

21. Apparatus of the character described, comprising, in combination, a support, a carrier movable along the support, a hoisting device on the carrier, means for propelling the carrier along the support including a stationary electric motor, a drum, a cable and a worm and worm gear transmission between the motor and drum; means for operating the hoisting device including a stationary electric motor, a drum, a cable, and a worm and worm gear transmission between the motor and drum; electric circuits for said motors having manually operable control switches, a portable hand device carrying said switches, and means automatically to open said switches when released by the operator.

22. Apparatus of the character described, comprising, in combination, a series of frames, an overhead track carried by said frames, a carrier movable along said track, a stationary electric motor, transmission means driven by the motor for causing the carrier to travel along the track, an electric circuit for said motor having switch means for opening and closing said circuit, electromagnetic means for controlling said switch means, a control circuit for said electromagnetic means including stations located at intervals along the track, and manually operable switch means for application to any one of said stations for controlling the control circuit.

23. Apparatus of the character described, comprising, in combination, a track, a carrier movable along the track, a stationary electric motor, transmission means driven by the motor for causing the carrier to travel along the track, and control means for said motor including an electric circuit, stations located at intervals along the track, and switch means manually operable at said stations for controlling said circuit.

24. Apparatus of the character described, comprising, in combination, a track, a carrier movable along the track, a stationary electric motor, transmission means driven by the motor for causing the carrier to travel along the track, and control means for said motor including an electric circuit, sockets at stations located at intervals along the track, and flexible conductor means having at one end thereof a plug adapted for insertion in any one of said sockets, said conductor means having a handle at the opposite end thereof provided with manually operable switch means.

25. Apparatus of the character described, comprising, in combination, a support, a hoisting device on the support, a stationary electric motor, transmission means driven by the motor for raising and lowering the hoisting device, and control means for the motor including electric circuits having switches, one for causing the raising and the other for causing the lowering of the hoisting device, and means automatically to hold either one of said switches open when the other is closed.

26. Apparatus of the character described, comprising, in combination, a support, a hoisting device on the support, an electric motor, transmission means driven by the motor for raising and lowering the hoisting device, and control means for the motor including electric circuits having switches, one for causing the raising and the other for causing the lowering of the hoisting device, and mechanical interlocking means automatically to hold either one of said switches open when the other is closed.

27. Apparatus of the character described, comprising, in combination, a support, a carrier on the support, an electric motor, transmission means driven by the motor for causing the carrier to travel along the support, and control means for the motor including electric circuits having switches, one for causing the raising and the other for causing the lowering of the hoisting device, and means automatically to hold either one of said switches open when the other is closed.

28. Apparatus of the character described, comprising, in combination, an overhead support, a carrier movable along the support, a hoisting device on the carrier, a stationary electric motor, transmission means driven by the motor for raising and lowering the hoisting device, and control means for the motor including an electric circuit provided with manually operable switch means and a handle containing said switch means and adapted to be grasped and carried by the hand of the operator when on the ground.

29. Apparatus of the character described, comprising, in combination, an overhead support, a hoising device on the support, a stationary electric motor, transmission means driven by the motor for raising and lowering the hoisting device, an electric circuit for controlling the motor including manually operable switches, one for causing the raising and the other for causing the lowering of the hoisting device, and a handle containing said switches and adapted to be grasped by the hand of the operator in controlling said switches.

30. Apparatus of the character described, comprising, in combination, an overhead support, a hoisting device on the support, a stationary electric motor, a drum driven by the motor, a cable on the drum and extending along the support for raising and lowering the hoisting device, an electric circuit for controlling the motor including manually operable switches, one for causing the raising and the other for causing the lowering of the hoisting device, and a handle containing said switches and adapted to be grasped by the hand of the operator when on the ground to control said switches.

31. Apparatus of the character described, comprising, in combination, an overhead support, a hoisting device on the support, a stationary electric motor, a drum, a worm and worm gear for imparting rotation from the motor to the drum, a cable on the drum and extending along the support for raising and lowering the hoisting device, an electric control circuit for the motor including manually operable switches, one for causing the raising and the other for causing the lowering of the hoisting device, and a handle containing said switches and adapted to be grasped by the hand of the operator when on the ground to control said switches.

32. Conveying apparatus, comprising, in combination, an overhead track, a support for the track, a light carrier having wheels on the track, a stationary electric motor, a drum, a worm and worm gear for imparting rotation from the motor to the drum, a cable on the drum extending along the track and connected to the carrier for causing the latter to travel along the track, an electric circuit for the motor, and means automatically to break the circuit to arrest the motor when the carrier has travelled on the track predetermined distances in opposite directions.

33. Hoisting apparatus, comprising, in combination, an overhead support, a hoisting device thereon, a stationary electric motor, a drum, a worm and worm gear for imparting rotation from the motor to the drum, a cable extending from the drum along the support, said cable having a loop sustaining the hoisting device, an electric control circuit for the motor having manually operable switch means, and a portable device containing the switch means and adapted to be carried from place to place by the operator when on the ground.

34. Hoisting apparatus, comprising, in combination, an overhead support, a hoisting device thereon, a stationary electric motor, means actuated by the motor for raising and lowering the hoisting device, electric control circuits for the motor having switches adapted to be closed, one for causing the raising and the other for causing the lowering of the hoisting device, a portable handle adapted to be carried from place to place by the operator when on the ground, said handle containing said switches, the latter being adapted to be closed by the hand of the operator, and means automatically to open said switches on release of the hand of the operator.

FRANK P. HUCKINS.